(12) United States Patent
Caramico (10) Patent No.: US 11,611,564 B2
(45) Date of Patent: Mar. 21, 2023

(54) METHODS AND SYSTEMS OF DUAL-LAYER COMPUTER-SYSTEM SECURITY

(71) Applicant: Luigius Caramico, Foster City, CA (US)

(72) Inventor: Luigius Caramico, Foster City, CA (US)

( * ) Notice: Subject to any disclaimer, the term of this patent is extended or adjusted under 35 U.S.C. 154(b) by 132 days.

(21) Appl. No.: 15/434,010

(22) Filed: Feb. 15, 2017

(65) Prior Publication Data

US 2017/0302679 A1     Oct. 19, 2017

Related U.S. Application Data

(60) Provisional application No. 62/295,147, filed on Feb. 15, 2016.

(51) Int. Cl.
*H04L 9/40* (2022.01)
*H04L 67/306* (2022.01)
*H04L 51/42* (2022.01)

(52) U.S. Cl.
CPC .......... *H04L 63/105* (2013.01); *H04L 51/42* (2022.05); *H04L 63/16* (2013.01); *H04L 63/20* (2013.01); *H04L 67/306* (2013.01); *H04L 63/0428* (2013.01); *H04L 63/102* (2013.01); *H04L 63/1425* (2013.01)

(58) Field of Classification Search
CPC ... H04L 63/105; H04L 51/22; H04L 63/0428; H04L 63/20; H04L 67/306
USPC .......................................................... 726/4
See application file for complete search history.

(56) References Cited

U.S. PATENT DOCUMENTS

| | | | |
|---|---|---|---|
| 8,387,110 B1* | 2/2013 | Cooper ................. | H04L 63/102 726/1 |
| 9,229,905 B1* | 1/2016 | Penilla ..................... | G06F 17/00 |
| 9,275,420 B1* | 3/2016 | Fredinburg ........... | G06F 3/0481 |
| 10,108,809 B2* | 10/2018 | Panchapakesan ... | H04L 63/0428 |
| 2004/0025048 A1* | 2/2004 | Porcari .................. | G06Q 10/10 726/1 |
| 2005/0055573 A1* | 3/2005 | Smith ................. | G06F 21/6218 726/4 |
| 2010/0058197 A1* | 3/2010 | Chee .................... | G06F 21/6218 715/751 |
| 2010/0100933 A1* | 4/2010 | Rose .................... | G06F 21/6218 726/3 |

(Continued)

OTHER PUBLICATIONS

Shabalala et al., 2014 IEEE, "Privacy Monitoring Framework for Enhancing Transparency in Cloud Computing", pp. 1-7 (Year: 2014).*

*Primary Examiner* — Khalil Naghdali (57) ABSTRACT

In one aspect, a computerized method for implementing dual-layer computer-system security in a private enterprise computer network includes the step of generating a user profile, wherein the user has access to the private enterprise computer network, wherein the user profile comprises an information comprises a specified user usage of the private enterprise computer network. The computerized method includes the step of setting a specified trigger value with respect to the specified user usage of the private enterprise computer network. The computerized method includes the step of detecting that the user usage exceeds the trigger value. The computerized method includes the step of modifying an access privilege of the user to the private enterprise computer network.

8 Claims, 11 Drawing Sheets

(56) References Cited

U.S. PATENT DOCUMENTS

| | | | |
|---|---|---|---|
| 2010/0100941 A1* | 4/2010 | Eom | G06F 21/6218 726/4 |
| 2010/0306008 A1* | 12/2010 | Grebenik | G06Q 10/06311 705/7.13 |
| 2010/0325724 A1* | 12/2010 | Grebenik | G06F 21/6218 726/21 |
| 2011/0150224 A1* | 6/2011 | Noh | H04L 9/0836 380/277 |
| 2011/0167483 A1* | 7/2011 | Lee | H04L 63/0823 726/6 |
| 2012/0131646 A1* | 5/2012 | Chandolu | G06F 21/6218 726/4 |
| 2012/0137373 A1* | 5/2012 | Miseldine | G06F 21/6227 726/28 |
| 2013/0166677 A1* | 6/2013 | Chung | G06F 9/542 709/217 |
| 2013/0198799 A1* | 8/2013 | Staggs | H04L 63/105 726/1 |
| 2014/0109193 A1* | 4/2014 | Desai | G06F 21/6281 726/4 |
| 2014/0196104 A1* | 7/2014 | Chari | H04L 63/20 726/1 |
| 2015/0222604 A1* | 8/2015 | Ylonen | H04L 63/062 713/171 |
| 2015/0264077 A1* | 9/2015 | Berger | G06F 21/554 726/23 |
| 2016/0036833 A1* | 2/2016 | Ardeli | H04L 63/101 726/22 |
| 2016/0098572 A1* | 4/2016 | Povalyayev | G06F 21/6218 726/28 |
| 2017/0134434 A1* | 5/2017 | Allen | H04L 63/20 |

\* cited by examiner

METHODS AND SYSTEMS OF DUAL-LAYER COMPUTER-SYSTEM SECURITY

CROSS-REFERENCE TO RELATED APPLICATIONS

This application claims priority to U.S. Provisional Application No. 62/295,147, titled METHODS AND SYSTEMS OF DUAL-LAYER COMPUTER-SYSTEM SECURITY ES filed on Feb. 15, 2016. This provisional application is incorporated by reference in its entirety.

This application incorporates by reference U.S. patent application Ser. No. 14/961,791 titled METHODS AND SYSTEMS OF INCREASING SECURITY QUALITY OF COMPUTING-DEVICE COMMUNICATIONS and filed on 7 Dec. 2015.

BACKGROUND

1. Field

This application relates generally to automated travel services, and more specifically to a system, article of manufacture and method for dual-layer computer-system security.

2. Related Art

Enterprises often store important information in enterprise networks. The privacy of this information may be crucial the interests of the enterprise. The enterprise may want to control access to the information. However, the enterprise network may have users (e.g. employees, customers, etc.) that require various levels of access to the enterprise's network and file systems. Accordingly, improvements to the methods of increasing enterprise network security are sought.

BRIEF SUMMARY OF THE INVENTION

In one aspect, a computerized method for implementing dual-layer computer-system security in a private enterprise computer network includes the step of generating a user profile, wherein the user has access to the private enterprise computer network, wherein the user profile comprises an information comprises a specified user usage of the private enterprise computer network. The computerized method includes the step of setting a specified trigger value with respect to the specified user usage of the private enterprise computer network. The computerized method includes the step of detecting that the user usage exceeds the trigger value. The computerized method includes the step of modifying an access privilege of the user to the private enterprise computer network.

BRIEF DESCRIPTION OF THE DRAWINGS

The Figures described above are a representative set, and are not an exhaustive set with respect to embodying the invention.

DESCRIPTION

Disclosed are a system, method, and article of manufacture for detecting and monitoring security vulnerabilities in computer systems. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Computer network can be a telecommunications network which allows computers to exchange data. The computer network can include various servers, client computing devices, routers, and like, that are administered by an entity. Various nodes of the computer network can be virtualized.

Domain (e.g. an administrative domain) can be a service provider holding a security repository permitting to easily authenticate and authorize clients with credentials. This can apply to computer network security.

Entity profile can be a computer representation an entity information.

Firewall can be a network security system that monitors and controls the incoming and outgoing network traffic based on predetermined security rules. A firewall can establish a barrier between a trusted, secure internal network and another outside network, such as the Internet, that is assumed not to be secure or trusted.

Machine learning can use pattern recognition and computational learning theory in artificial intelligence to construction of algorithms that can learn from and make predictions on data. Machine Learning can include any of several methods, devices, and/or other features which are optimized to perform a specific informational task (e.g. such as classification or regression) using examples of data of a given form, and are then capable of exercising this same task on unknown data of the same type and form. The machine (e.g., a computer, a server functionality, etc.) can learn, for example, by identifying patterns, categories, statistical relationships, etc., exhibited by training data. The result of the learning can then be used to predict whether new data exhibits the same patterns, categories, statistical relationships. Examples include neural networks, support vector machines (SVMs), decision trees, hidden Markov models, Bayesian networks, Gram Schmidt, reinforcement-based learning, genetic algorithms, and cluster-based learning.

Natural Language Generation (NLG) can include the natural language processing task of generating natural language from a machine representation system such as a knowledge base or a logical form.

Secure Sockets Layer (SSL) is a cryptographic protocol that provides communications security over a computer network.

Tunneling protocol can allow a network user to access or provide a network service that the underlying network does not support and/or provide directly.

Virtual private network (VPN) can extend a private network across a public network, such as the Internet.

Windows Management Instrumentation (WMI) can include a set of extensions to the Windows Driver Model that provides an operating system interface through which instrumented components provide information and notification.

Exemplary Methods

The following methods and system scan be used to detect and monitor security vulnerabilities in computer systems. In some embodiments, a dual-level protection approach can be implemented. A first level of protection can monitor the activity in real-time profiling users and generating alarm when an unusual activity is detected from the user. The first level can detect various illegal/prohibited activities in an enterprise's computer network, an entity's servers and/or client devices. The first level may not require client software. Accordingly, it can be deployed rapidly in a managed network environment. The first level may not allow the usage of wireless devices, for example. The enterprise's computer network can include one or more enterprise private networks and the various enterprise's computer system and/or database resources coupled with the one or more enterprise private networks.

A second level can implement a safety net to protect the most confidential and important documents via various techniques such as, inter alia, total encryption, etc. In remote case that level one (1) is not be capable of detecting an illegal activity, the attacker can access documents that are encrypted and each document require a separate encryption key. Encryption-key management can add an additional source of information to detect an anomaly in the system/s patterns. A key management server can manage the day-to-day operation making vice-versa impossible for an attacker to access the keys. The second level may not allow clients/users to retain the encryption/decryption keys, but, instead, can have them to request the encryption/decryption keys to the key management server. Accordingly, even authorized users can have problems to deviate from their usual pattern without raising an alarm. In some events an alarm can automatically cause various user access privileges to be disabled. In some embodiments, the second level can install a client-software agent and allow the usage of wireless devices. The following figures provided further descriptions of various aspects of methods and systems for detecting and monitoring security vulnerabilities in computer systems.

Figure 1:
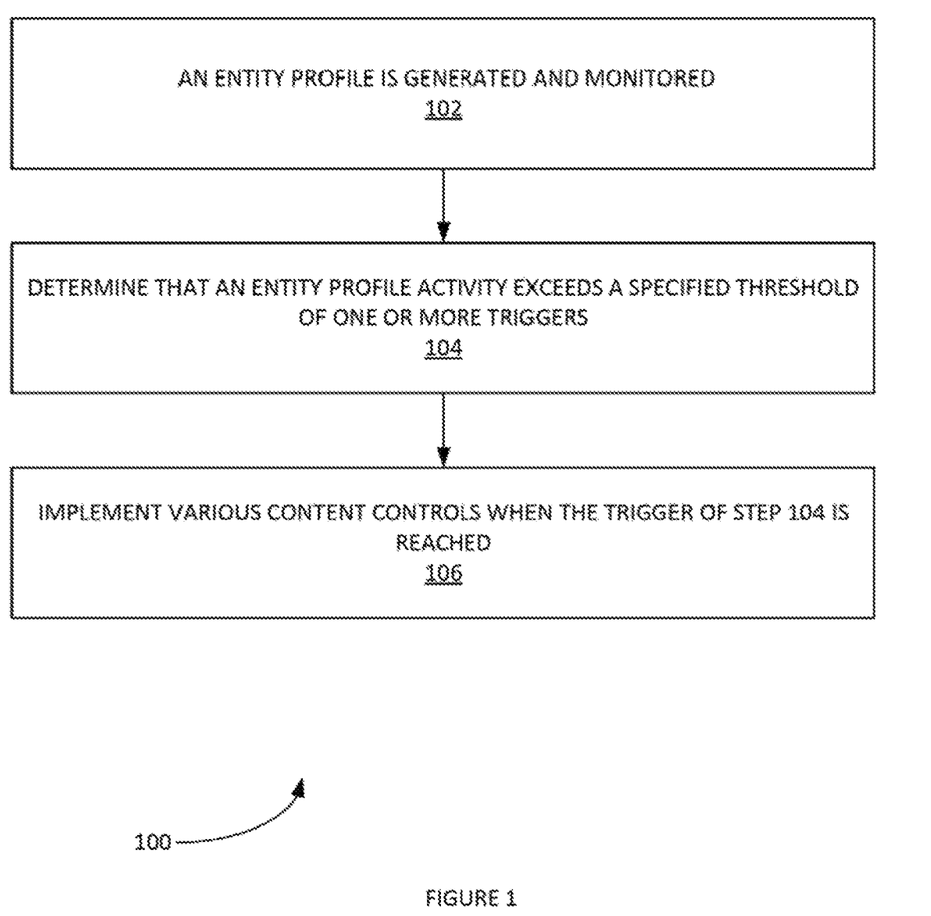
FIG. 1 illustrates an example process dual-layer computer system security, according to some embodiments.

FIG. 1 illustrates an example process dual-layer computer-system security, according to some embodiments. As used herein a computer system can include an enterprise computer network.

In step 102, an entity profile is generated and monitored. An entity can be a user, a client-device, an application, etc. Various historical and/or real-time entity behavior patterns can be obtained and used to generate the entity profile.

Entity profile information can include user name, demographics, device types used, (e.g. smartphones, laptop computers, desktop computers, etc.), applications used, any user activity in an application (e.g. modifying application, reading application, saving application, etc.), any information the user saves to a data store, type of data store, amount and identity of data stored, electronic mail use, other electronic message usage patterns, etc. Entity profile information can be expressed in terms of rates, probabilities, percentages, etc., and provide values. For example, a user may access a particular application (e.g. a word process program) during a certain time-of-day range with a specific computing device type (e.g. a laptop computer). All of this information can be used to generate the user's entity profile in terms of variables that represent a specific entity attribute, as well as, provide a value (and/or a weight) for the variable. The entity profile itself can be modeled as a variable with a value that is a function of the various attribute values used. It is noted that the rate of change of entity and/or entity attribute values can also be monitored and receive a separate score.

The value of an entity attribute can be updated in real time (e.g. assuming networking and/or processing latency, etc.). For example, a log server 304 can monitor entity activity and log said entity activity in a log that is stored in a database. Pre-defined trigger thresholds can be defined and stored as well. A trigger can be an event that causes process 100 to implement a content control process (e.g. as provided infra in step 106). A trigger can be a variation of an entity profile and/or attribute score that exceeds a specified threshold. Thresholds can be set based on a network administrator's security tolerance for the entity. For example, a user can change a computing device type and the change can be a trigger. A user can normally download n-bytes of data an hour on average and the user may suddenly exceed this value. Another example of a trigger can be a change in a data storage type by a user. For example, a user may normally store ninety percent (90%) of her data a company database. The user may store seventy-five percent (75%) of her data in a USB thumb drive connected to her lap top. This event can be a trigger. The amount and/or identity of the data being stored to the USB thumb drive can also be a trigger (e.g. triggers can be compounded). Triggers can be pre-defined by a system administrator. Triggers can be assigned specifically to an entity profile. For example, new employees can have lower threshold triggers. Devices with USB ports can have lower threshold triggers. Devices that can be ported outside of an enterprises property can have lower triggers. A CIO can have a higher trigger threshold. These are provided by way of example of not of limitation. Universal Serial Bus (USB) is an industry standard that defines the cables, connectors and communications protocols used in a bus for connection, communication, and power supply between computers and electronic devices In step 104, it can be determined that an entity profile activity exceeds a specified threshold of one or more triggers. In some embodiments, a system administrator can specify various permutations of attribute triggers that are to be reached before step 104 is specified. In another embodiment, the overall entity profile value that is a cumulative function of a set of attribute triggers can be the only trigger that is used for step 104.

In step 106, various content controls can be implemented when the trigger of step 104 is reached. Example content controls can include, inter alia: removing entity/user permissions; blocking access to specified content; blocking access to email applications; blocking access to a USB thumb drive; blocking access to specified enterprise databases; alerting a system administrator; encrypting specified data files; etc. Other content control processes are provided herein.

In some embodiments, various machine learning rules can be used to implement process 100. For example, machine-earning rules/algorithms can be used to identify patterns in an entity profile data. In some embodiments, supervised, unsupervised and/or reinforcement learning algorithms can be utilized. Process 100 can flexibly, combine different learning rules (e.g. supervised, unsupervised, reinforcement learning) with different methods (e.g. online or batch learning). In some examples, machine learning can be used to identify one or more entity profile patterns for past security breaches. These identified patterns can then be used to update various entity-profile triggers. Accordingly, it is noted, that in some embodiments, in lieu of and/or in addition to having a system administrator manually set/update triggers, a machine-learning module can automatically set/update various entity profile triggers. In this, way process 100 can automatically adapt a computer network security settings after a security breach has been identified and analyzed. In some example, machine learning and/or other predictive analytics techniques can be used to predict various potential attacks to an entity's computer network.

Process 100 can be used to control outbound traffic from an entity's computer network. Process 100 can be used to stop information leakage and/or document exfiltration. Process 100 can be used to profile users in real-time. The profile can enable process 100 to automatically: detect network behavior anomalies (e.g. at the user level, the device level, the application level, etc.); prevent document dumps; prevent unauthorized information collection; predict potential threats to security; identify potential malware/Trojan infections; etc.

Exemplary Computer Architecture and Systems

Figure 2:
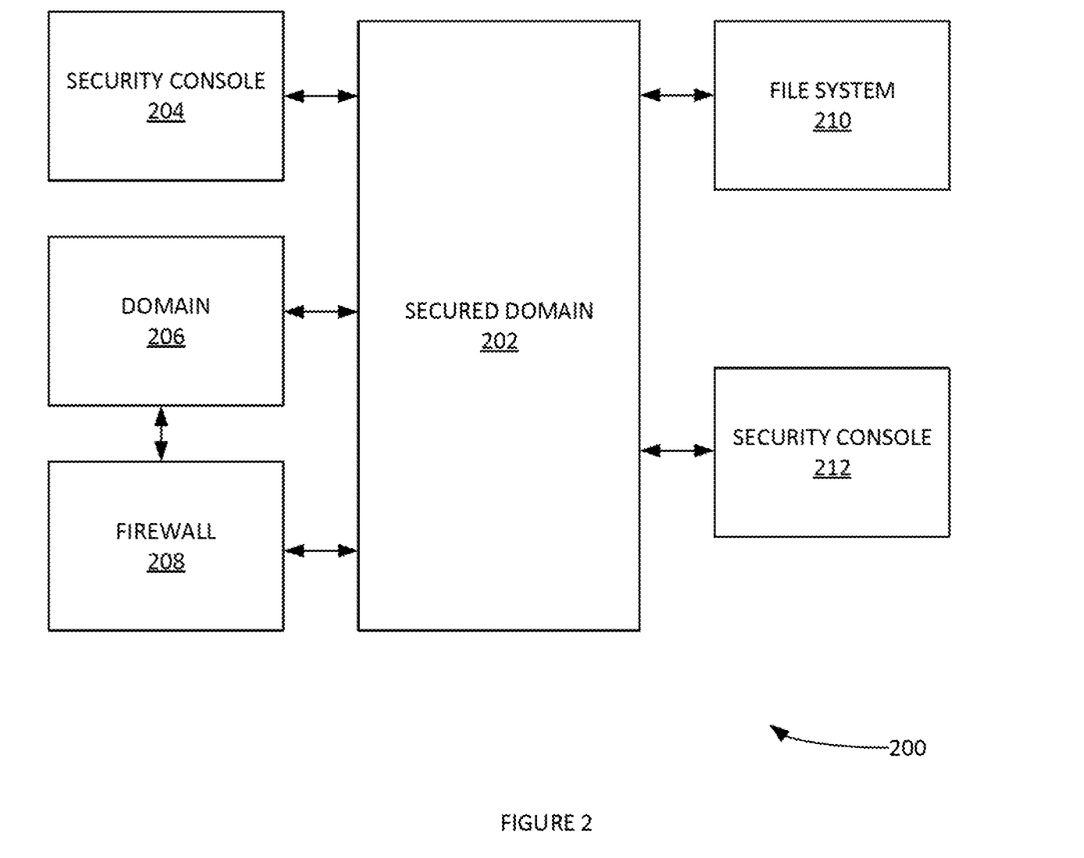
FIG. 2 illustrates an example symbolic representation of a process used to detect and monitor security vulnerabilities in computer systems, according to some embodiments.

FIG. 2 illustrates an example system 200 for detecting and monitoring security vulnerabilities in computer systems, according to some embodiments. System 200 can include a secure-domain system 202. Secure-domain system 202 can be used to implement process 100 and/or other process provided herein. Secure-domain system 202 can implement a dual-level protection approach can be implemented. A first level of protection can monitor the activity in real-time profiling users and generating alarm when an unusual activity is detected from the user. The first level can detect various illegal/prohibited activities in an enterprise's computer network, an entity's servers and/or client devices. The first level may not require client software. Accordingly, it can be deployed rapidly in a managed network environment. The first level may not allow the usage of wireless devices, for example. A second level can implement a safety net to protect the most confidential and important documents via various techniques such as, inter alia, total encryption, etc. An example secure-domain system 202 is provided in FIG. 3 provided infra.

System 200 can include security console 204, security console 204 can be used by security administrators of system 200. Security console 204 can control various security protocols of system 200 (e.g. set permissions, deactivate user access, deactivate computing system access, etc.). Secure-domain system 202 can communicate security alerts to Security console 204 (e.g. when a user violates his respective profile, etc.). Secure-domain system 202 can block/control/limit user access to domain 206. Firewall 208 can block/control/limit VPN access to domain 204 and/or other aspect of system 200. System 200 can include file system 210. System 200 can include user-computing system 212. user-computing system 212 can be used by a user to breach various security protocols of system 200.

Figure 3:
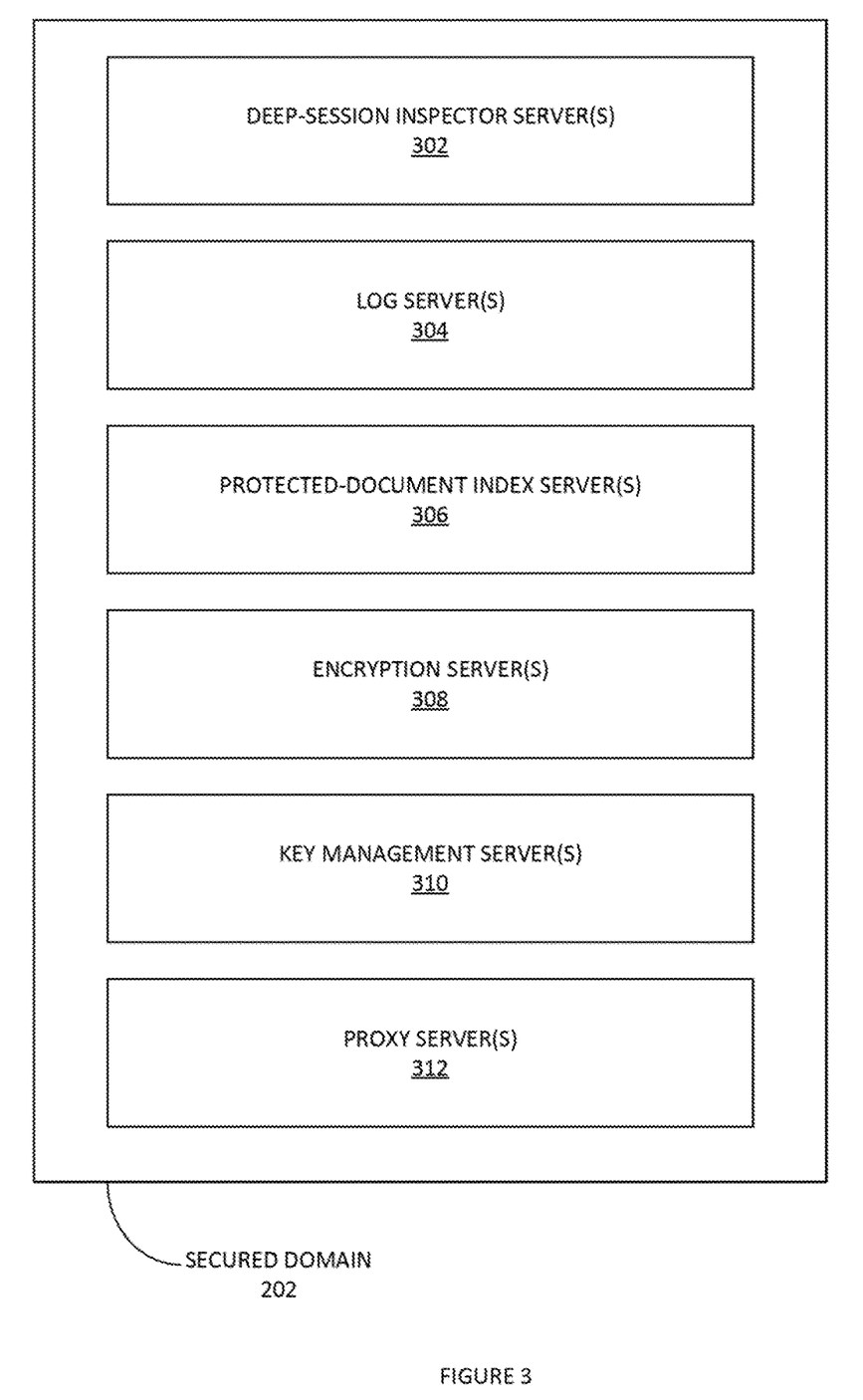
FIG. 3 illustrates another example system for detecting and monitoring security vulnerabilities in computer systems.

FIG. 3 illustrates another example secure-domain system 202 for detecting and monitoring security vulnerabilities in computer systems. Exemplary components of a system that implements secure-domain system 300 can include the following.

A deep-session inspector server 302 that can include dedicated server/s depending on traffic/users. A deep-session inspection server 302 can inspect various entity activities (e.g. web pages a user is connecting to, inspect an email to determine if includes a snippet of classified documents, etc.). The deep-session inspector server can inspect HTTP/HTTPS, SMTP, IMAP, POP3 connection(s) and perform a Level-7 inspection. The deep-session inspector server inspect can check for protected content via metadata, keyword, file name, file signature, content (looking for partial match between data output and protected documents via index server). The deep-session inspector server can stop VPN and/or Tunnel connections. The deep-session inspector server can stop any file that has been encrypted or is in an unknown format.

A log server 304 that can include dedicated server/s depending on traffic/users. The log server 304 can log various user activities. The log server 304 can log the activity being monitored (e.g. via logs and/or WMI agents). The log server 304 can any documents a user is accessing, creating, copying, deleting, modifying files, etc. The log server 304 can log the identity of the application used to access files. The log server 304 can log whether the user is inserting a USB flash drive, inserting a USB device like Wi-Fi, Bluetooth® network, etc. The log server 304 can log when the user accesses an encryption/decryption keys. The log server 304 can log when a user attempts to copy data to the flash drive. The log server 304 can attempt to upload files to external devices via internal wireless networks. The log server 304 can log Internet input/output traffic. The log server 304 can device/location used to log in and access. It is noted that, as used herein, another entity (e.g. a device identity, an application identity, etc.) can be used in lieu of a user in various example embodiments.

A protected-document index server 306 that can include dedicated server/s depending on traffic/users. The protected-document index server 306 can index various protected documents. A profiler server can include various dedicated server/s depending on traffic/users. The profile server can generate user profiles. An index server can index the protected docs (e.g. via text index). Corporate servers can be configured to include no additional software). Corporate server can manage, inter alia: security policy, audit logs, WMI agents, etc. Corporate clients can be configured to include no additional software. Corporate clients can manage, inter alia: security policy, WMI agents, audit logs, document access application, encryption transparent management, etc.

Additionally, system 300 can include various modules not shown. For example, system 300 can include machine learning and predictive analytics engines. System 300 can include web servers, search engines, natural language processing engines, database managers, etc.

System 300 can include an encryption server 308 for implementing various encryption processes as provided herein. The encryption server 308 can encrypt various content. Documents can be encrypted with an individual fully random strong key. The document key can be saved (e.g. in a key management server 310). Each authorized user can obtain a copy of the key re-encrypted with her specific public key. The authorized-user private key can access the specific document encryption key. A document can be accessed by authorized application. The authorized application can decrypt the document. The authorized application can add a user specific watermark to the document. The encryption server 308 can revoke authorization to a user (e.g. for all documents or for specified documents and/or document types, etc.). The deletion of the user specific re-encrypted document key can prevent a user from accessing the document. A client application can check each time a document is accessed to determine if the user still has the decryption key and therefore is still authorized.

System 300 can also include one or more proxy server(s) 312. In some embodiments, all traffic in and/or out of an organization's computing network can transit via one or more proxy server 312. For example, SSL traffic can be terminated at a proxy-server layer. Encrypted traffic may not be authorized to transit via the proxy-server layer. At the user level, VPN and/or tunnel protocols can be prohibited. The proxy server 312 can prevent various specified documents from passing outside of the entity's computer network (e.g. the document is: encrypted, in an unknown format, etc.). The proxy server 312 can prevent mobile devices from accessing secure documents.

Additional Processes

Figure 4:
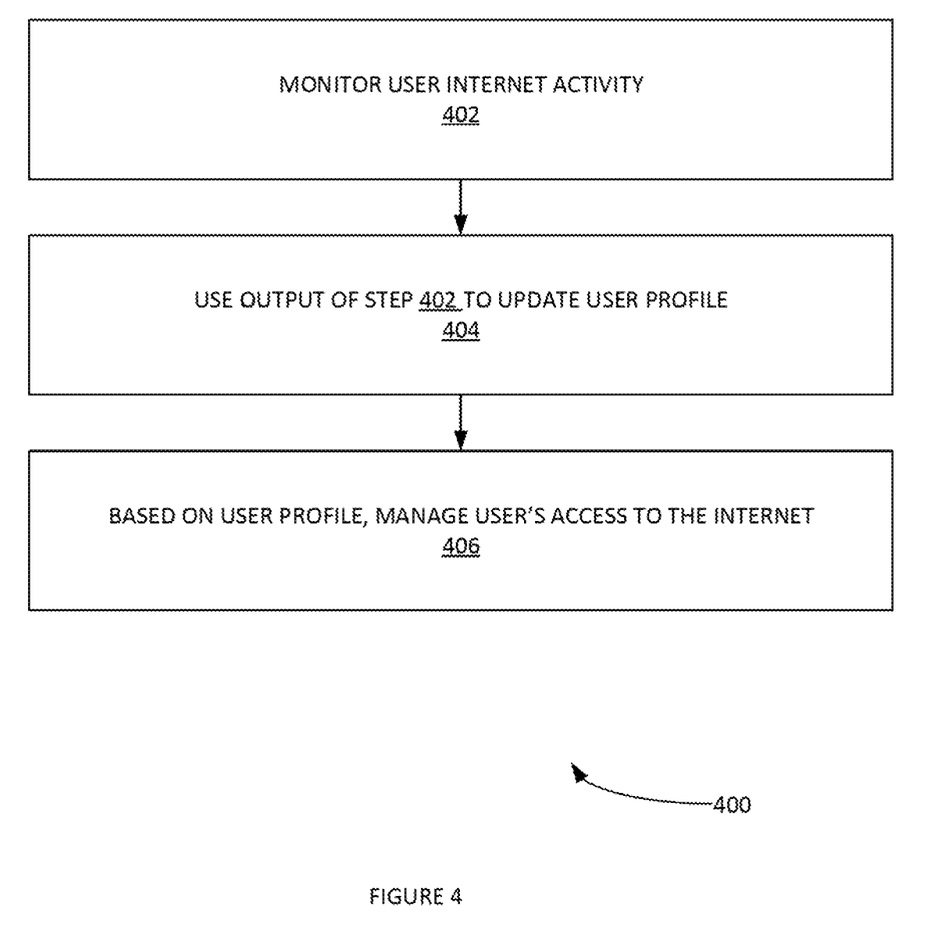
FIG. 4 illustrates an example of generating and maintaining a user profile that can be implemented by the profile server of system, according to some embodiments.

FIG. 4 illustrates an example process 400 for detecting and monitoring security vulnerabilities in computer systems, according to some embodiments. In step 402, process 400 can monitor user internet activity. In step 404, process 400 can use output of step 402 to update user profile. In step 406, based on user profile, process 400 can manage user's access to the Internet.

Figure 5:
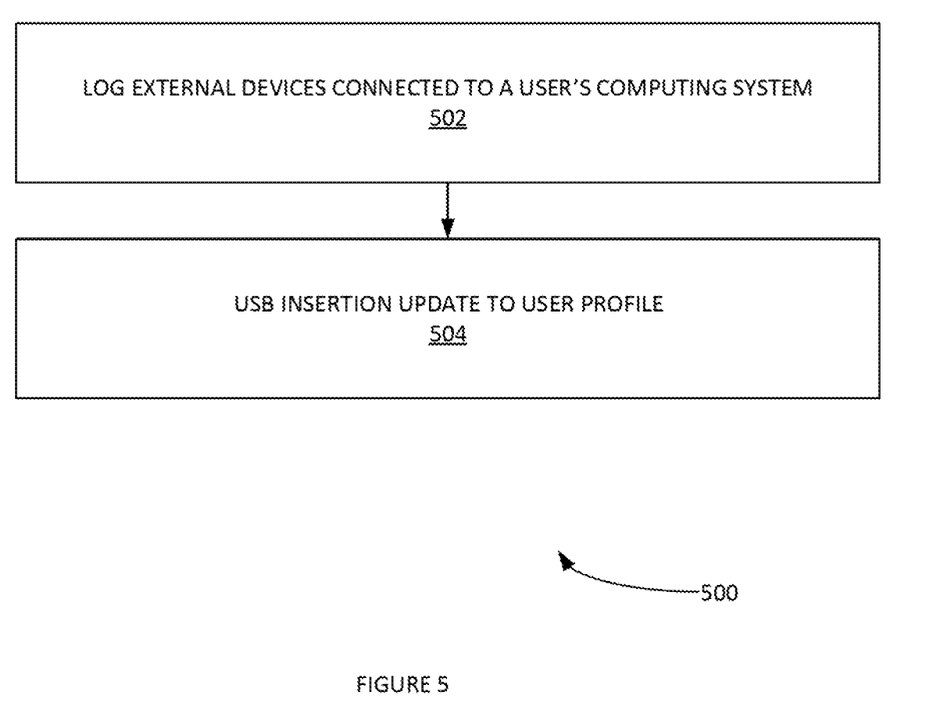
FIG. 5 illustrates an example process for detecting and monitoring security vulnerabilities in computer systems, according to some embodiments.

FIG. 5 illustrates an example process 500 for detecting and monitoring security vulnerabilities in computer systems, according to some embodiments. In step 502, process 500 can log external devices connected to a user's computing system (e.g. a USB insertion, etc.). In step 502, process 500 can use a USB insertion etc. to update to a user profile.

Figure 6:
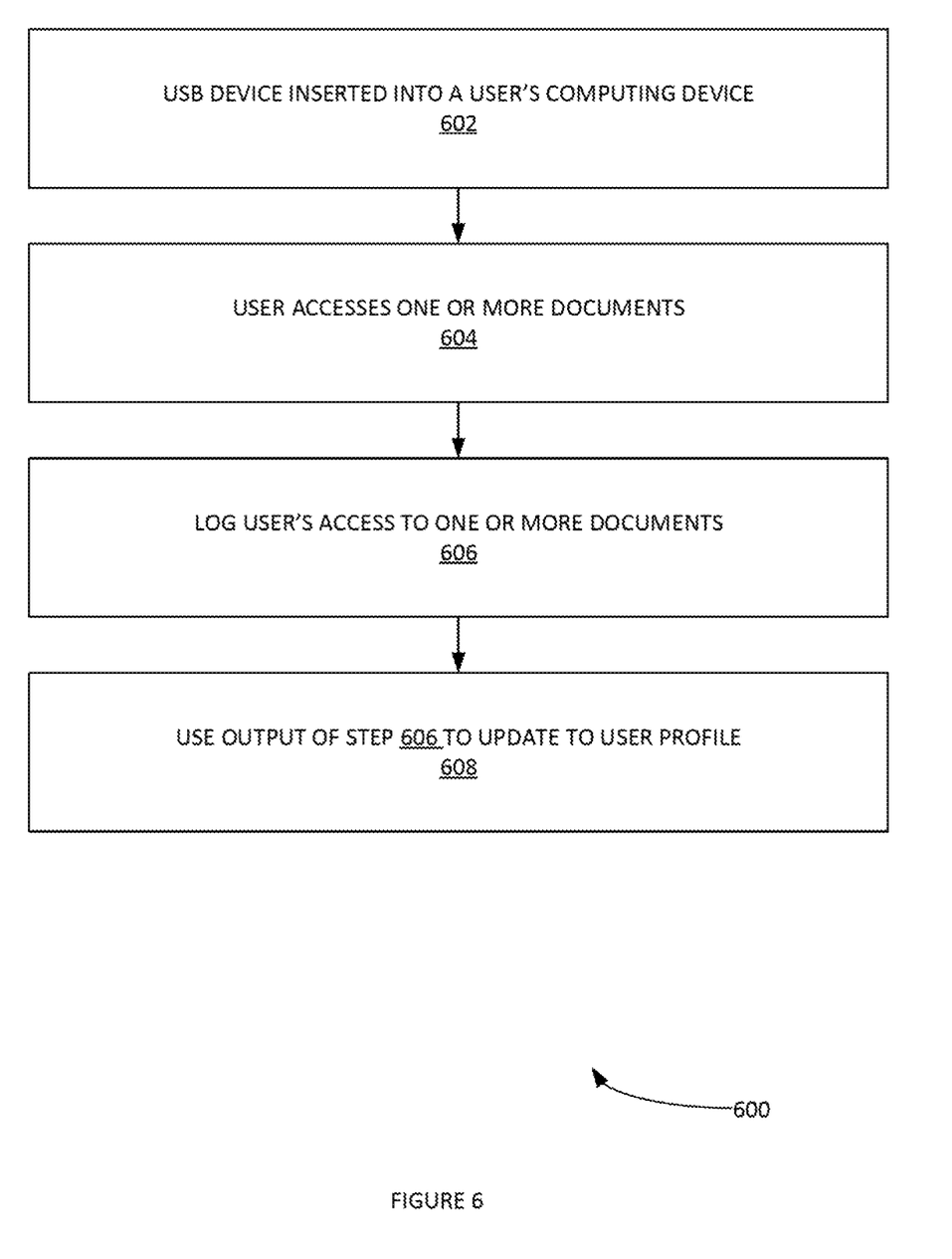
FIG. 6 illustrates an example process for detecting and monitoring security vulnerabilities in computer systems, according to some embodiments.

FIG. 6 illustrates an example process 600 for detecting and monitoring security vulnerabilities in computer systems, according, to some embodiments. In step 602, process 600 can detect that a USB device inserted into a user's computing device. In step 604, process 600 can determine that the user accesses one or more documents. These documents can be documented. In step 606, process 600 can log user's access to one or more documents. In step 608, process 600 can use output of step 606 to update to user profile.

Figure 7:
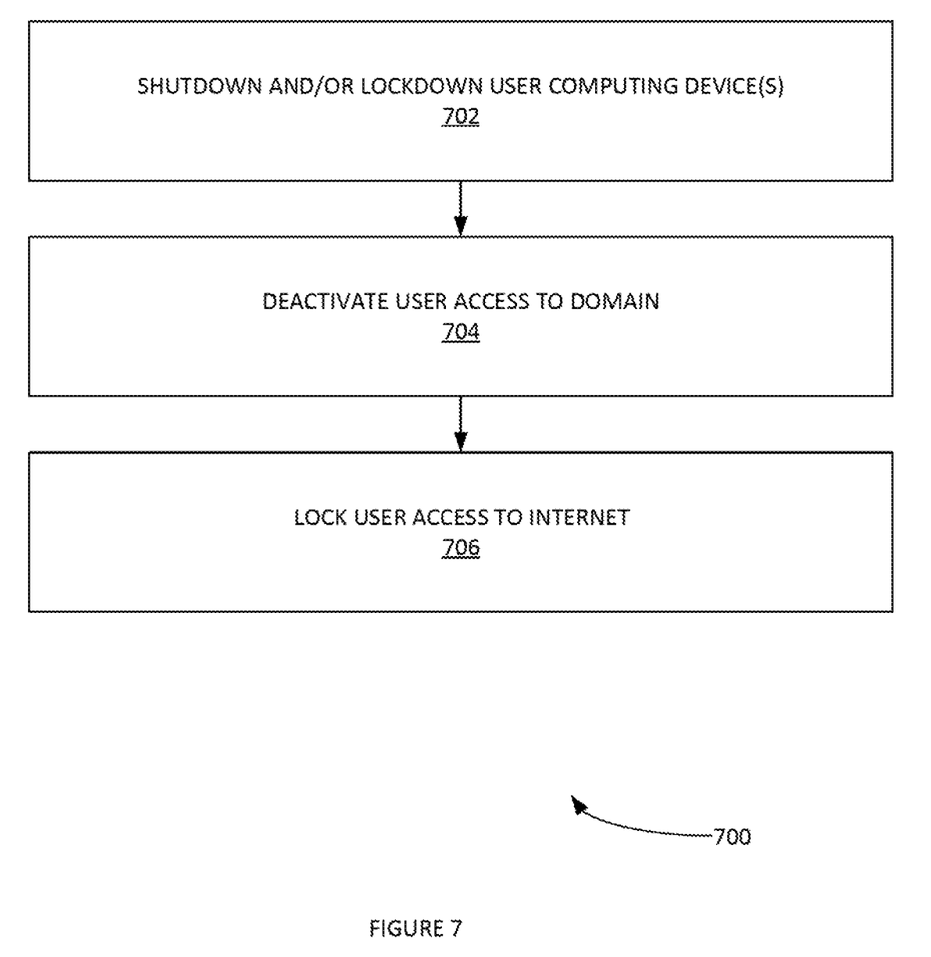
FIG. 7 illustrates an example process for detecting and monitoring security vulnerabilities in computer systems, according to some embodiments.

FIG. 7 illustrates an example process 700 for detecting and monitoring security vulnerabilities in computer systems, according to some embodiments, in step 702, process 700 can shutdown and/or lockdown user computing device(s). In step 704, process 700 can deactivate user access to domain. In step 706, process 700 can lock user access to Internet.

Figure 8:
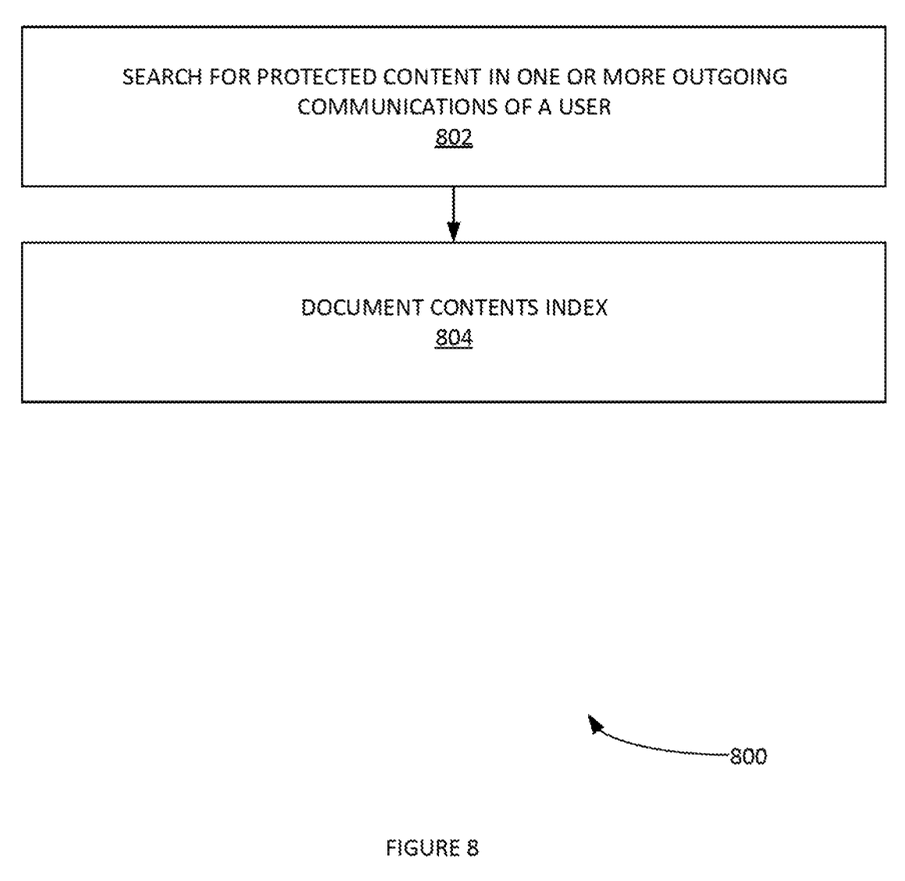
FIG. 8 illustrates an example process for detecting and monitoring security vulnerabilities in computer systems, according to some embodiments.

FIG. 8 illustrates an example process 800 for detecting and monitoring security vulnerabilities in computer systems, according to some embodiments. In step 802, process 800 can search for protected content in one or more outgoing communications of a user. In step 804, process 800 can document contents index.

Figure 9:
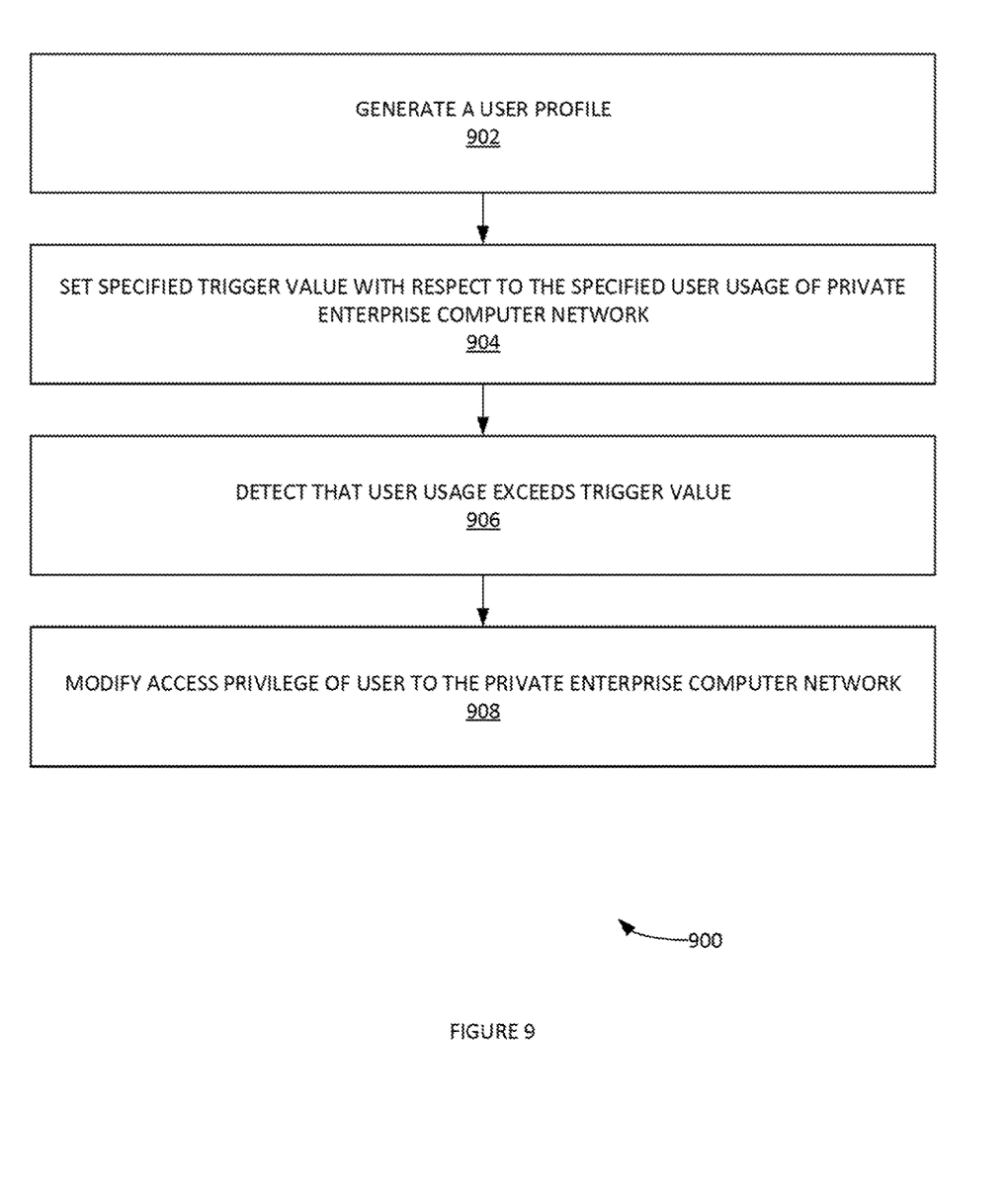
FIG. 9 illustrates an example process of a computerized method for implementing dual-layer computer-system security in a private enterprise computer network, according to some embodiments.

FIG. 9 illustrates an example process of a computerized method for implementing dual-layer computer-system security in a private enterprise computer network, according to some embodiments. In step 902, process 900 can generate a user profile. The user has access to the private enterprise computer network. The user profile includes an information comprises a specified user usage of the private enterprise computer network. In step 904, process 900 can set a specified trigger value with respect to the specified user usage of the private enterprise computer network. In step 906, process 900 can detect that the user usage exceeds the trigger value. In step 908, process 900 can modify an access privilege of the user to the private enterprise computer network.

Additional Example Computing System

Figure 10:
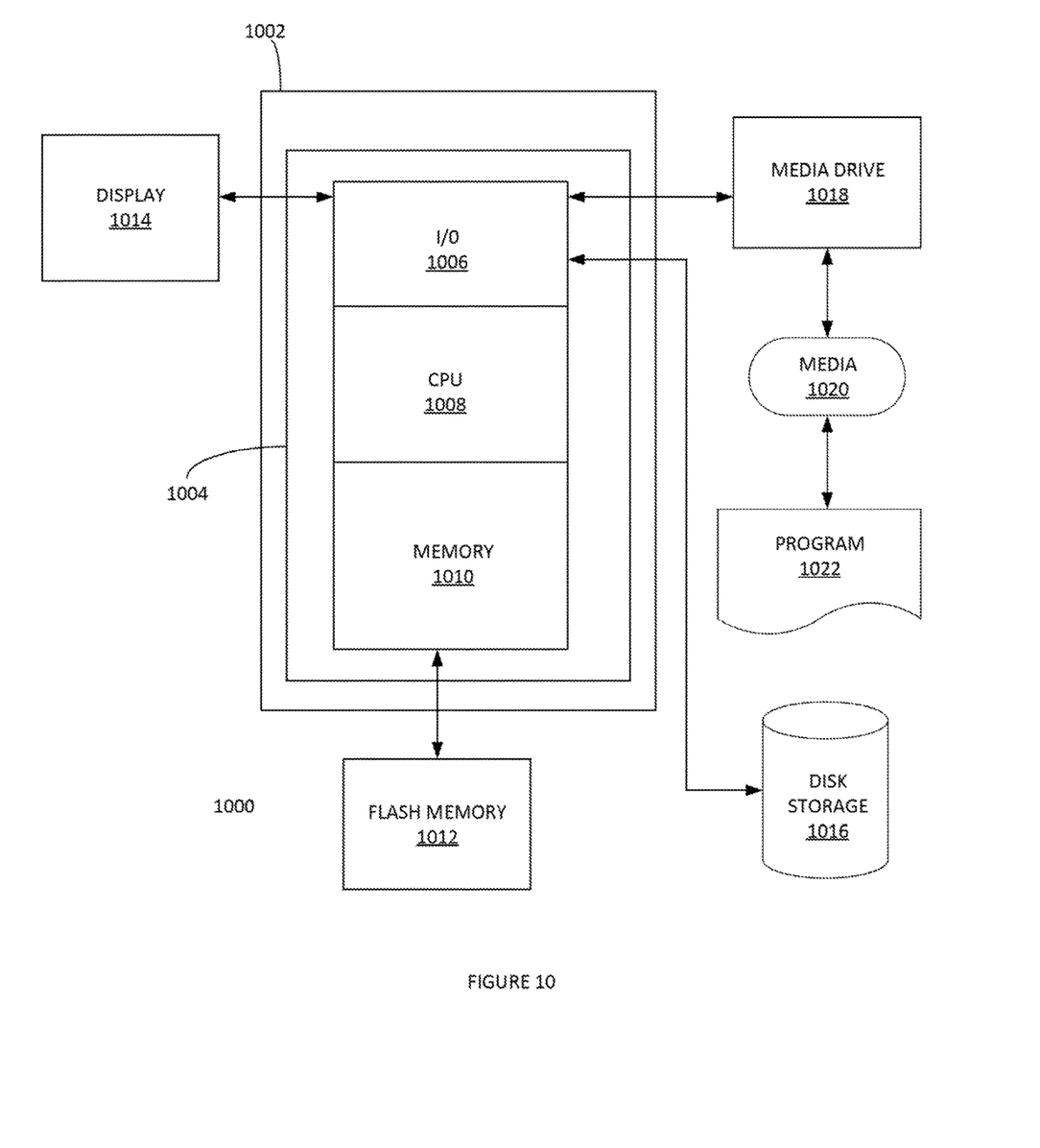
FIG. 10 depicts an exemplary computing system that can be configured to perform any one of the processes provided herein.

FIG. 10 depicts an exemplary computing system 1000 that can be configured to perform any one of the processes provided herein. In this context, computing system 1000 may include, for example, a processor, memory, storage, and I/O devices (e.g., monitor, keyboard, disk drive, Internet connection, etc.). However, computing system 1000 may include circuitry or other specialized hardware for carrying out some or all aspects of the processes. In some operational settings, computing system 1000 may be configured as a system that includes one or more units, each of which is configured to carry out some aspects of the processes either in software, hardware, or some combination thereof.

FIG. 10 depicts computing system 1000 with a number of components that may be used to perform any of the processes described herein. The main system 1002 includes a motherboard 1004 having an I/O section 1006, one or more central processing units (CPU) 1008, and a memory section 1010, which may have a flash memory card 1012 related to it. The I/O section 1006 can be connected to a display 1014, a keyboard and/or other user input (not shown), a disk storage unit 1016, and a media drive unit 1018. The media drive unit 1018 can read/write a computer-readable medium 1020, which can contain programs 1022 and/or data. Computing system 1000 can include a web browser. Moreover, it is noted that computing system 1000 can be configured to include additional systems in order to fulfill various functionalities. Computing system 1000 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 11:
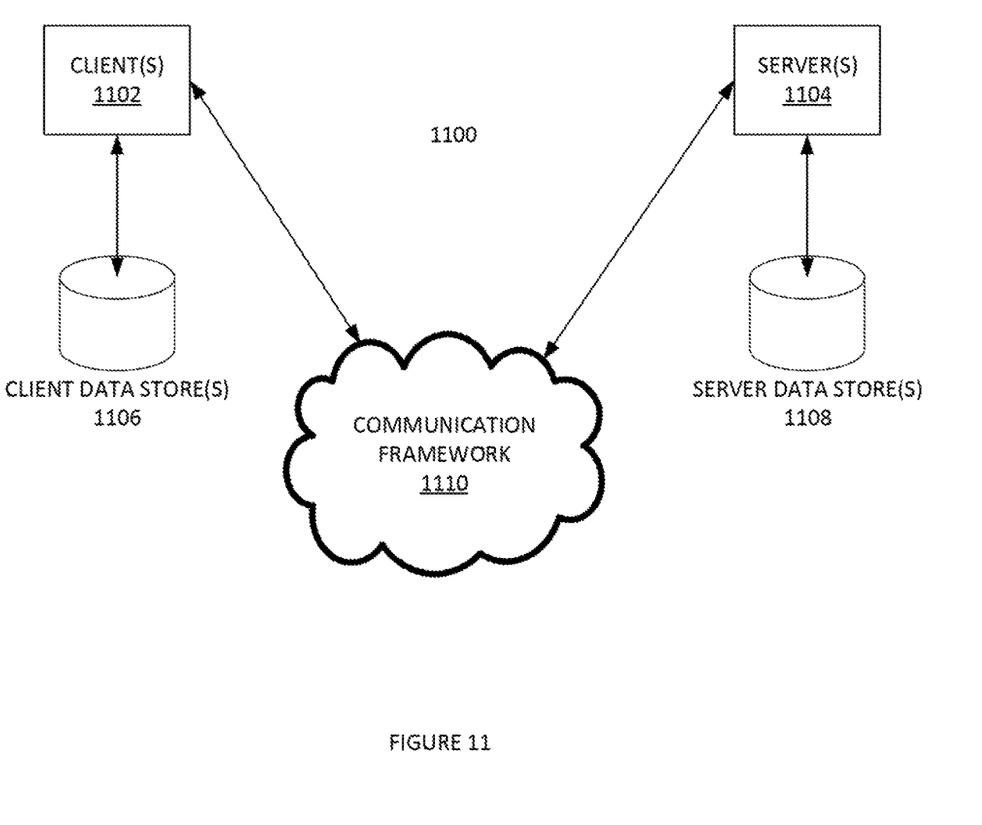
FIG. 11 is a block diagram of a sample computing environment that can be utilized to implement various embodiments.

FIG. 11 is a block diagram of a sample computing environment 1100 that can be utilized to implement various embodiments. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). One possible communication between a client 1102 and a server 1104 may be in the form of a data packet adapted to be transmitted between two or more computer processes. The system 1100 includes a communication framework 1110 that can be employed to facilitate communications between the client(s) 1102 and the server(s) 1104. The client(s) 1102 are connected to one or more client data store(s) 1106 that can be employed to store information local to the client(s) 1102. Similarly, the server(s) 1104 are connected to one or more server data store(s) 1108 that can be employed to store information local to the server(s) 1104. In some embodiments, system 1100 can instead be a collection of remote computing services constituting a cloud-computing platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing dual-layer computer-system security in a private enterprise computer network comprising:
   generating a user profile, wherein the user has access to the private enterprise computer network, wherein the user profile comprises an information that comprises a specified user usage of the private enterprise computer network, wherein the user profile is expressed in terms of a probability;
   setting a specified trigger value with respect to the specified user usage of the private enterprise computer network, wherein trigger value is based on a length of period of employment of the user;
   detecting that the user usage exceeds the trigger value; and
   modifying an access privilege of the user to the private enterprise computer network,
   wherein the specified user usage of the private enterprise computer network comprises an information the user saves to a data store, a type of the data store and an amount data stored,
   wherein the specified user usage of the private enterprise computer network comprises an identity of data stored and an amount of data electronic mail use, and
   wherein the specified user usage of the private enterprise computer network comprises other electronic message usage pattern.

2. The computerized method of claim 1, wherein the specified user usage of the private enterprise computer network comprises a type of program used by the user on a daily basis.

3. The computerized method of claim 2 further comprising:
   updating the user profile on a period basis when it is detected that user has access to the private enterprise computer network.

4. The computerized method of claim 3, wherein the user profile is modeled as a variable with a value that is a function of a weighted set of attributes used to generate the user profile.

5. The computerized method of claim 4, wherein the trigger comprises a specified rate of change of an entity attribute value.

6. The computerized method of claim 5, wherein the step of setting a specified trigger value with respect to the specified user usage of the private enterprise computer network further comprising:
   detecting that the user is downloading one or more files from the private enterprise computer network to a Universal Serial Bus (USB) thumb drive; and
   determining that the process of downloading one or more files from the private enterprise computer network to the USB thumb drive is not in the user's profile.

7. The computerized method of claim 5, wherein the step of modifying the access privilege of the user to the private enterprise computer network comprises blocking access to specified content further comprises:

blocking the user's access to an email application of the enterprise; and blocking the user's access to a USB thumb drive.

8. The method of claim 7, wherein the step of modifying the access privilege of the user to the private enterprise computer network comprises blocking access to specified content further comprises:

blocking access to specified enterprise databases;

alerting a system administrator of the private enterprise computer network; and encrypting a specified set of data files in an enterprise file system that are accessible by the user.

\* \* \* \* \*